United States Patent
Hsieh et al.

(10) Patent No.: US 10,439,492 B1
(45) Date of Patent: Oct. 8, 2019

(54) CONTROL SYSTEM OF SWITCHING VOLTAGE REGULATOR

(71) Applicant: NUVOTON TECHNOLOGY CORPORATION, Hsinchu (TW)

(72) Inventors: Chung-Ming Hsieh, Hsinchu (TW); Wei-Chan Hsu, Cupertino, CA (US)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 16/354,411

(22) Filed: Mar. 15, 2019

(30) Foreign Application Priority Data

Jun. 7, 2018 (TW) .............................. 107119700 A

(51) Int. Cl.
*H02M 3/07* (2006.01)
(52) U.S. Cl.
CPC ..................................... *H02M 3/07* (2013.01)
(58) Field of Classification Search
CPC .. H02M 3/06; H02M 3/07; H02M 3/155–158; H02M 1/14; H02M 1/32; H02M 2001/007; H02M 2001/008; H02M 2001/0054; G05F 3/02; Y02B 70/1491
USPC .................. 323/234, 304, 311; 713/300, 320
See application file for complete search history.

(56) References Cited

U.S. PATENT DOCUMENTS

| | | | |
|---|---|---|---|
| 8,856,562 B2* | 10/2014 | Huang | G05F 3/02 |
| | | | 713/300 |
| 9,601,998 B2* | 3/2017 | Le | H02M 3/158 |
| 2018/0013342 A1* | 1/2018 | Cherniak | H02M 3/07 |
| 2018/0212521 A1* | 7/2018 | Hsieh | H02M 3/158 |
| 2018/0337594 A1* | 11/2018 | Zhang | H02M 3/07 |

* cited by examiner

*Primary Examiner* — Yemane Mehari
(74) *Attorney, Agent, or Firm* — Muncy, Geissler, Olds & Lowe, P.C.

(57) ABSTRACT

A control system of a switching voltage regulator includes an adjustable switched-capacitor conversion circuit, an error generator, and a controlling module. The adjustable switched-capacitor conversion circuit has a plurality of discrete conversion rates, and selects a corresponding conversion rate and outputs an output voltage according to a signal of the conversion rate. An error generator is connected to the adjustable switched-capacitor conversion circuit and compares the output voltage with an external reference voltage to obtain an error voltage. The controlling module is connected between the error generator and the adjustable switched-capacitor conversion circuit to store a plurality of control variable sets, and selects one of plurality of control variable sets according to the error voltage. Afterwards, the controlling module calculates to output the signal of the conversion rate and further adjust the output voltage according to the selected control variable sets.

11 Claims, 8 Drawing Sheets

CONTROL SYSTEM OF SWITCHING VOLTAGE REGULATOR

This application claims priority from Taiwan Patent Application No. 107119700, filed on Jun. 7, 2018, in the Taiwan Intellectual Property Office, the content of which is hereby incorporated by reference in its entirety for all purposes.

FIELD OF THE INVENTION

The present invention relates to a control system of a voltage regulator, more particularly to a control system applied to a switching voltage regulator.

BACKGROUND OF THE INVENTION

Every electronic device has a demand for a specific voltage in the modern era of electronic technology. Therefore, a voltage regulator is needed for the electronic device to meet specification of power. The voltage regulators commonly used in the market are switching regulators which do not generate heat easily and output voltages thereof are able to be adjusted by switch elements inside thereof to steadily output to external load elements. However, overshooting always occurs when the output voltage of the switching regulator increases, and causes a malfunction of electronic elements. The switching regulator can be added with other electronic elements to prevent overshooting, but this would increase manufacturing costs. How to solve the aforementioned problem has become an issue in the industry.

SUMMARY OF THE INVENTION

In view of the aforementioned problems, the present invention provides a control system of a switching voltage regulator to solve the conventional problems.

In an embodiment, the present invention provides a control system of a switching voltage regulator, including an adjustable switched-capacitor conversion circuit, an error generator, and a controlling module. The adjustable switched-capacitor conversion circuit has a plurality of discrete conversion rates and includes a voltage input end, a voltage output end, and a conversion rate control end. The voltage input end receives an input voltage. The voltage output end outputs an output voltage to a load element. The conversion rate control end receives a signal of the conversion rate. The adjustable switched-capacitor conversion circuit utilizes one of the plurality of discrete conversion rates according to the signal of the conversion rate and converts the input voltage into the output voltage according to the used conversion rate, so as to make the output voltage fall within a voltage regulation range. The error generator is connected to the voltage output end, and compares the output voltage and an external reference voltage to obtain an error voltage. The controlling module is connected between the error generator and the adjustable switched-capacitor conversion circuit, and includes a storage unit, a selection unit, a proportional unit, a differential unit, and an integral unit. The storage unit stores a plurality of control variable sets. The selection unit selects one of the plurality of control variable sets according to the error voltage. At least two of the proportional unit, the differential unit, and the integral unit calculate to obtain a calculation result according to the selected control variable set and generate and transmit the signal of the conversion rate to the conversion rate control end.

Preferably, the adjustable switched-capacitor conversion circuit is a fine-resolution switched-capacitor circuit.

Preferably, when the load element requires different voltage regulation range and an operational frequency of the adjustable switched-capacitor conversion circuit is adjusted, the error voltage is changed and the selection unit then selects at least one of the plurality of control variable sets to make the output voltage fall within the required voltage regulation range. Different error voltages correspond to different control variable sets to meet voltage requirements of different load elements.

Preferably, the controlling module can include a lookup unit configured to select a corresponding signal of the conversion rate according to the calculation result.

Preferably, the selection unit separates a range of the error voltage into a plurality of error voltage groups. The plurality of error voltage groups include a stable error voltage group and a plurality of unstable error voltage groups. The storage unit separates the plurality of control variable sets into a plurality of control variable groups according to the error voltage groups. The plurality of control variable groups include a stable control variable group and a plurality of unstable control variable groups.

Preferably, the selection unit selects the stable control variable group when the selection unit determines that the error voltage falls within the stable error voltage group, and the proportional unit, the differential unit, and the integral unit calculate to obtain the calculation result according to the selected stable control variable set.

Preferably, when the selection unit determines that the error voltage falls within one of the plurality of unstable error voltage groups, the selection unit selects the unstable control variable group corresponding to the unstable error voltage group where the error voltage falls. The proportional unit, the differential unit, and the integral unit calculate to obtain the calculation result according to the selected unstable control variable set and further adjust the signal of the conversion rate until the output voltage falls within the voltage regulation range.

Preferably, when the load element needs a first voltage regulation range higher than the voltage regulation range, the error voltage increases and the operational frequency of the adjustable switched-capacitor conversion circuit is also adjusted to be higher, and the selection unit re-selects the corresponding control variable set to make the output voltage fall within the first voltage regulation range, so as to prevent overshooting.

Preferably, when the load element needs a second voltage regulation range lower than the voltage regulation range, the error voltage decreases and the operational frequency of the adjustable switched-capacitor conversion circuit is also adjusted to be lower, and the selection unit re-selects the corresponding control variable sets to make the output voltage fall within the second voltage regulation range, so as to prevent undershooting.

Preferably, the error generator includes an analog digital conversion element and a subtraction element. The analog digital conversion element is connected to the voltage output end and converts the output voltage into a digital output voltage. The subtraction element is connected between the analog digital conversion element and the controlling module and generates the error voltage between he digital output voltage and the external reference voltage.

As stated, the control system of a switching voltage regulator of the present invention includes the following advantages.

First, for increasing or decreasing the output voltage, the control system of a switching voltage regulator of the present invention utilizes the signal of the conversion rate outputted from the controlling module, to adjust the conversion rate, to further control the output voltage to increase or decrease steadily, so as to prevent overshooting or undershooting.

Secondly, the control system of a switching voltage regulator of the present invention generates the plurality of different control variable sets according to different output voltages to correspond to different voltage requirements for different load elements.

DETAILED DESCRIPTION OF THE ILLUSTRATED EMBODIMENTS

It is to be understood that the advantages, features, and technical methods of the present invention are explained in more detail with reference to the exemplary embodiments and the drawings. Moreover, the present invention may be realized in different forms and should not be construed as the embodiments limited herein. On the contrary, for those of ordinary skill in the art, the embodiments provided will help convey the scope of the present invention more thoroughly, comprehensively, and completely. Furthermore, the present invention will be defined only by the scope of the appended claims.

Figure 1:
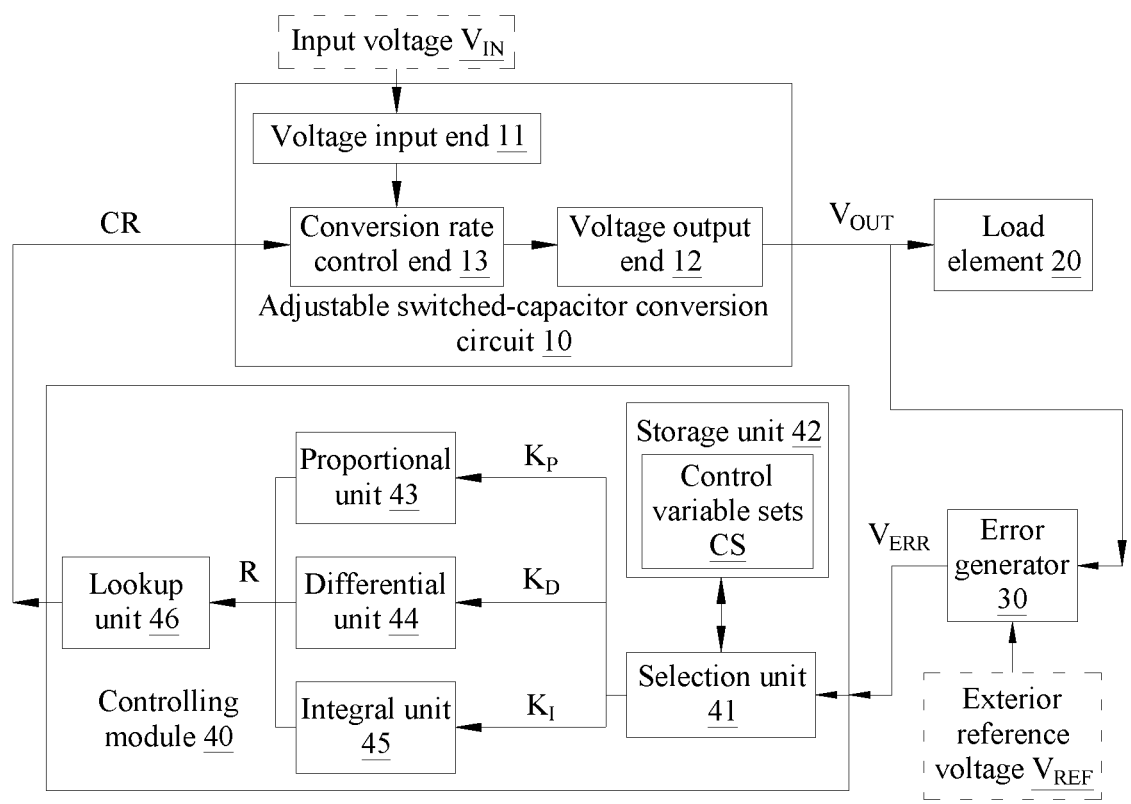
FIG. 1 is a block diagram of the control system of a switching voltage regulator according to the first embodiment of the present invention.

Please refer to FIG. 1, illustrating the block diagram of the control system of a switching voltage regulator according to the first embodiment of the present invention. In the embodiment, the control system of a switching voltage regulator of the present invention includes an adjustable switched-capacitor conversion circuit 10, an error generator 30, and a controlling module 40. The adjustable switched-capacitor conversion circuit 10 has a plurality of discrete conversion rates and includes a voltage input end 11, a voltage output end 12, and a conversion rate control end 13. The voltage input end 11 receives an input voltage $V_{IN}$. The voltage output end 12 outputs an output voltage $V_{OUT}$ to a load element 20. The conversion rate control end 13 receives a signal of the conversion rate CR. The adjustable switched-capacitor conversion circuit 10 utilizes one of the discrete conversion rates according to the signal of the conversion rate CR and converts the input voltage $V_{IN}$ into the output voltage $V_{OUT}$ according to the used conversion rate, to make the output voltage $V_{OUT}$ fall within a voltage regulation range. The error generator 30 is connected to the voltage output end 12, and compares the output voltage $V_{OUT}$ and an external reference voltage $V_{REF}$ to obtain an error voltage $V_{ERR}$. The controlling module 40 is connected between the error generator 30 and the adjustable switched-capacitor conversion circuit 10, and includes a storage unit 42, a selection unit 41, a proportional unit 43, a differential unit 44, an integral unit 45, and a lookup unit 46. The storage unit 42 stores a plurality of control variable sets CS. The selection unit 41 selects one of the plurality of control variable sets CS according to the error voltage $V_{ERR}$. At least two of the proportional unit 43, the differential unit 44, and the integral unit 45 can calculate to obtain a calculation result R according to the selected control variable set CS. The control variable sets CS include a differential variable $K_D$, an integral variable $K_I$, and a proportional variable $K_P$. The lookup unit 46 selects the corresponding the conversion rate CR according to the calculation result R, and generate and transmit the signal of the selected conversion rate CR to the conversion rate control end 13. When the load element 20 requires different voltage regulation range and the operational frequency of adjustable switched-capacitor conversion circuit 10 can be adjusted, the error voltage $V_{ERR}$ is changed and the selection unit 41 then selects at least one of the control variable sets CS to make the output voltage $V_{ERR}$ fall within the required voltage regulation range, so as to steadily output different output voltage $V_{OUT}$. In an embodiment, different error voltage $V_{ERR}$ corresponds to different control variable set CS to meet voltage requirement for different load element 20.

In an embodiment, the adjustable switched-capacitor conversion circuit 10 can be a fine-resolution switched-capacitor circuit. The adjustable switched-capacitor conversion circuit 10 includes a plurality of switches and a plurality of capacitors, and can be cascaded with another adjustable switched-capacitor conversion circuit 10, and one of the voltage output ends of the adjustable switched-capacitor conversion circuits 10 can serve as the voltage output end 12.

The fine-resolution adjustable switched-capacitor conversion circuit 10 can be adjusted with the more accurate conversion rate compared to other switched-capacitor conversion circuits on the market. For example, the output voltage $V_{OUT}$ can be adjusted by percentile, even thousand digits, thereby improving the accuracy of the output voltage $V_{OUT}$.

An average small signal analysis of single adjustable switched-capacitor conversion circuit 10 is described in the following paragraph. The resistance of the load element 20 is denoted as $R_L$. The equivalent resistance of the adjustable switched-capacitor conversion circuit 10 is denoted as $R_{OUT}$. The conversion rate is denoted as CR. The direct current signal of the input voltage is denoted as $V_{IN}(dc)$. The alternating current signal of the input voltage is denoted as $v_{in}(s)$. The direct current signal of the conversion rate is denoted as $CR(dc)$. The alternating current signal of the conversion rate is denoted as $cr(s)$. The alternating current signal of the output voltage is denoted as $v_{out}(s)$. With the input voltage $V_{IN}=V_{IN}(dc)+v_{in}(s)$, the conversion rate CR=CR(dc)+cr(s), and the output voltage $V_{OUT}=v_{out}(s)$, the following equation is obtained:

$$V_{IN}*CR=V_{IN}(dc)*cr(s)+v_{in}(s)*CR(dc)$$

Figure 2:
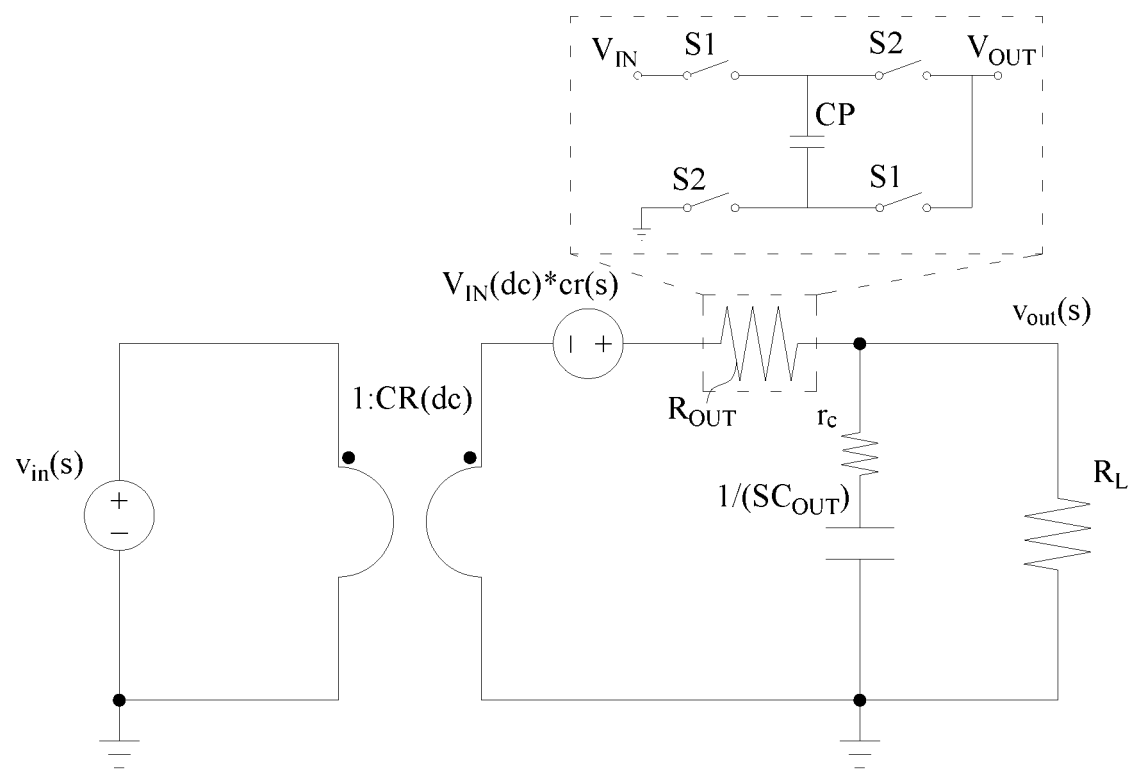
FIG. 2 is a circuit diagram of the control system of a switching voltage regulator according to the first embodiment of the present invention.

The circuit analysis is shown in FIG. 2 and the following equations can be obtained:

$$G_{cr}(s)=(v_{out}(s)/cr(s))=V_{IN}*(Z(s)/(Z(s)+R_{OUT}))$$

$$G_{io}(s)=(v_{out}(s)/v_{in}(s))=CR*(Z(s)/(Z(s)+R_{OUT}))$$

$$Z(s)=(r_c+(1/sC_{OUT}))//(R_L)$$

$$R_{OUT}=1/(f*CP)$$

$Z(s)$ is the equivalent impedance of the signal analysis of the adjustable switched-capacitor conversion circuit 10. $G_{cr}(s)$ and $G_{io}(s)$ are transfer functions. $G_{cr}(s)$ is the transfer function of the output voltage $v_{out}(s)$ to the conversion rate cr(s). $G_{io}(s)$ is the transfer function of the output voltage $v_{out}(s)$ to the input voltage $v_{in}(s)$. Each of the values of $G_{cr}(s)$ and $G_{io}(s)$ is less than 1. The adjustable switched-capacitor conversion circuit 10 tends to be stable. $C_{OUT}$ is the equivalent capacitance. In addition, the single adjustable switched-capacitor conversion circuit 10 can include two first switches S1, two second switches S2, and one capacitance CP, and have an operational frequency f. $r_c$ is the impedance of the capacitance CP. Considering the equations above, it is known that the equivalent resistance $R_{OUT}$ of the single adjustable switched-capacitor conversion circuit 10 is related to the operational frequency f Taking the equivalent resistance $R_{OUT}$ of the single adjustable switched-capacitor conversion circuit 10 into the transfer function $G_{cr}(s)$, it is also known that the higher the operational frequency f is, the larger the transfer function $G_{cr}(s)$ can be, and the output voltage $v_{out}(s)$ also increases.

The error generator 30 generates the error voltage $V_{ERR}$ according to the output voltage $V_{OUT}$. The selection unit 41 selects the corresponding control variable set CS in the storage unit 42 according to the error voltage $V_{ERR}$. The transfer function $G_{PID}$ of the corresponding control variable sets CS is presented as follows:

$$G_{PID}(z)=((K_P+K_I+K_D)+(K_P*(1+\alpha)+K_I*\alpha+2K_D)*z^{-1}+(\alpha K_P+K_D)*z^{-2})/(1-(1+\alpha)*z^{-1}+\alpha z^{-2})$$

Wherein, α is a coefficient. The transfer function $G_{PID}$ of the control variable sets CS then varies along with the change of the error voltage $V_{ERR}$. The error voltage $V_{ERR}$ is related to the output voltage $V_{OUT}$, and the output voltage $V_{OUT}$ is also related to the operational frequency f of the plurality of adjustable switched-capacitor conversion circuits 10. Therefore, the transfer function $G_{PID}$ of the plurality of control variable sets CS is related to the operational frequency f of the plurality of adjustable switched-capacitor conversion circuits 10. When the operational frequencies f of the plurality of adjustable switched-capacitor conversion circuits 10 are changed, the transfer function $G_{PID}$ of the plurality of control variable sets CS needs to be changed accordingly.

Figure 3:
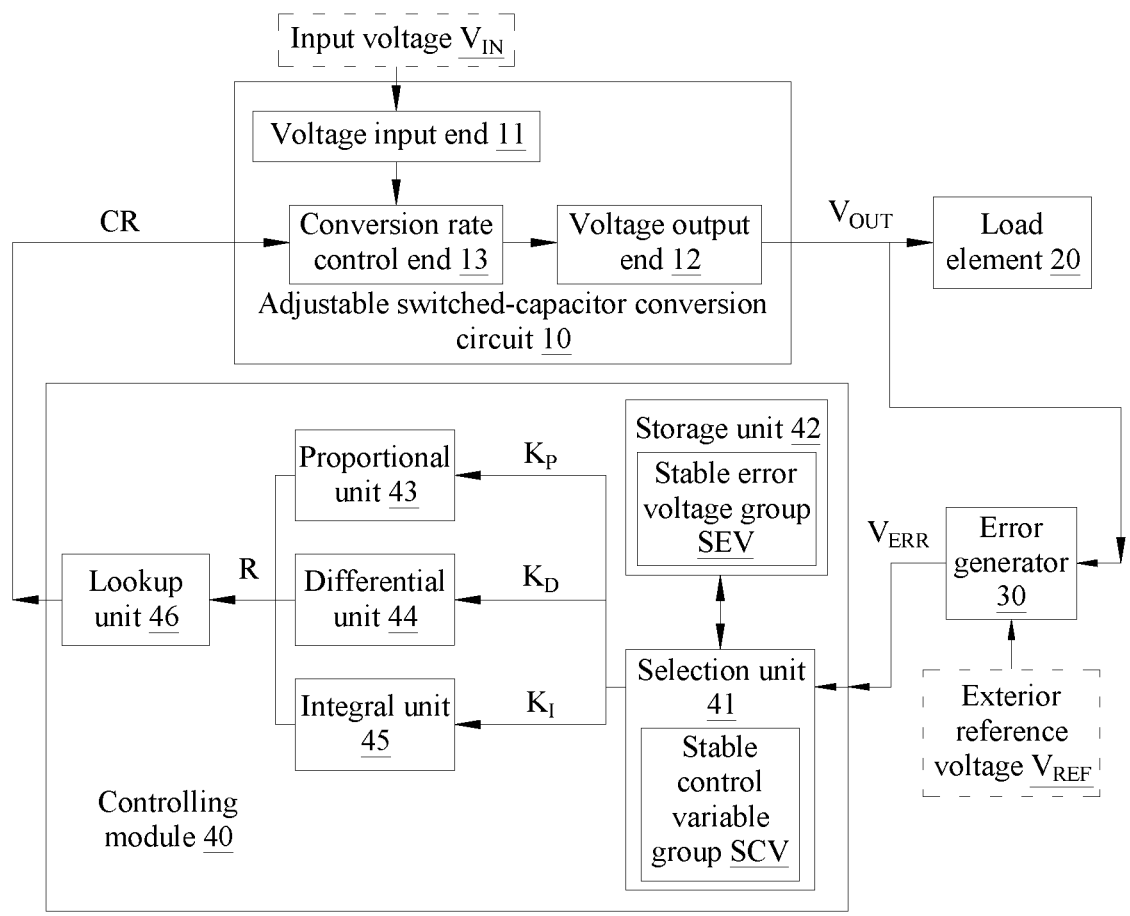
FIG. 3 is a block diagram of the control system of a switching voltage regulator according to the second embodiment of the present invention when the error voltage corresponds to a stable independent variable.
Figure 4:
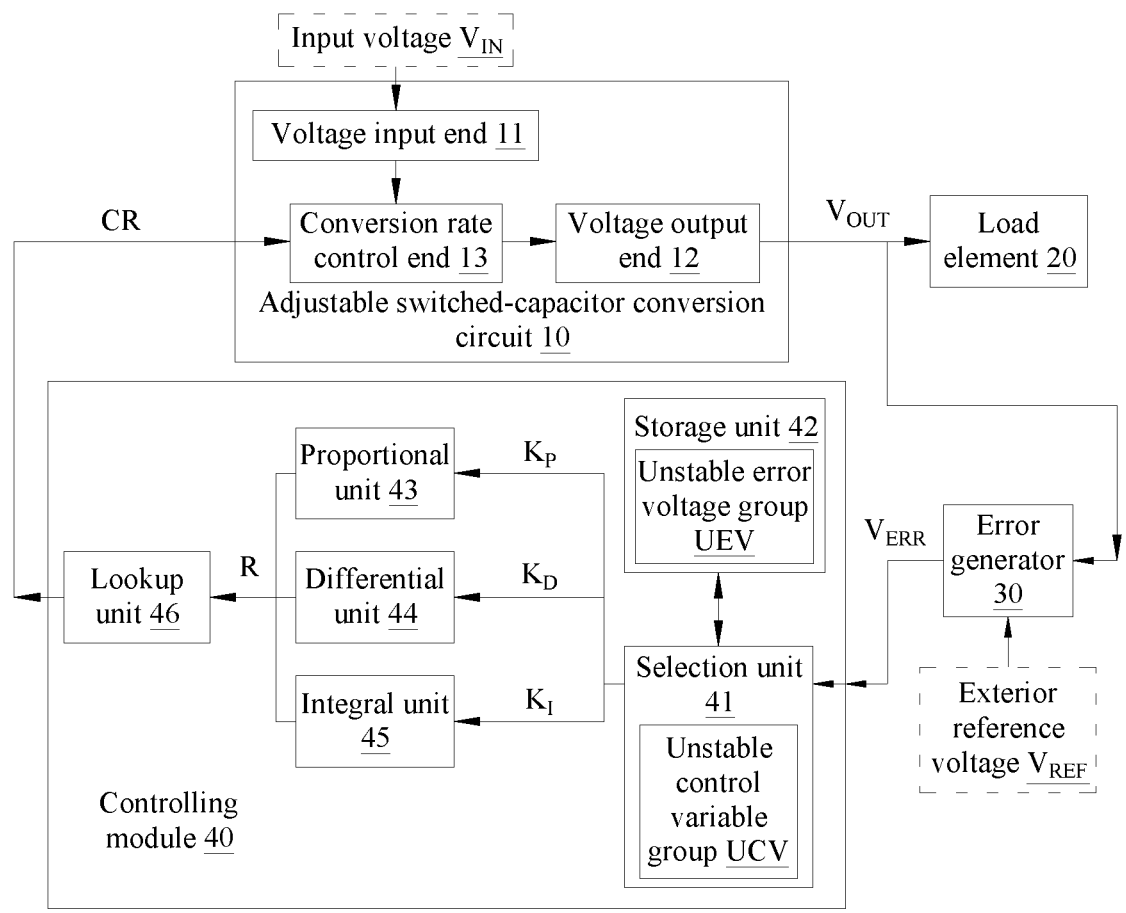
FIG. 4 is a block diagram of the control system of a switching voltage regulator according to the second embodiment of the present invention when the error voltage corresponds to an unstable independent variable.
Figure 5:
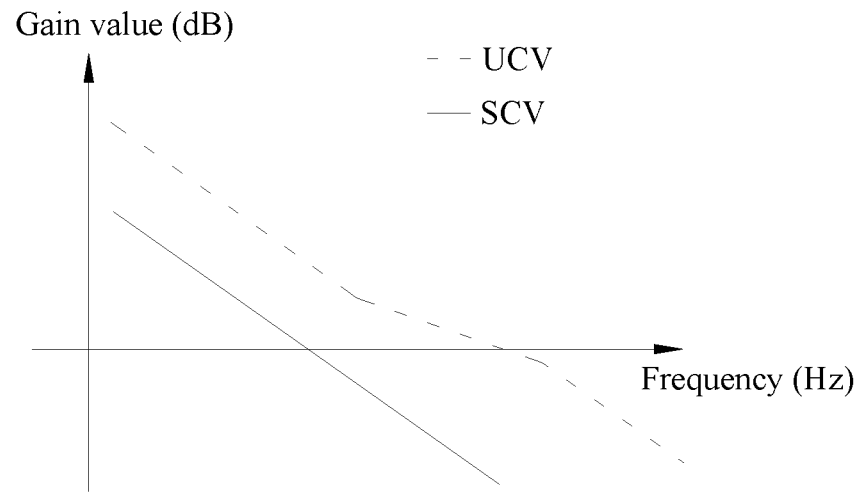
FIG. 5 is a frequency response diagram of the control system of a switching voltage regulator according to the second embodiment of the present invention.
Figure 5:
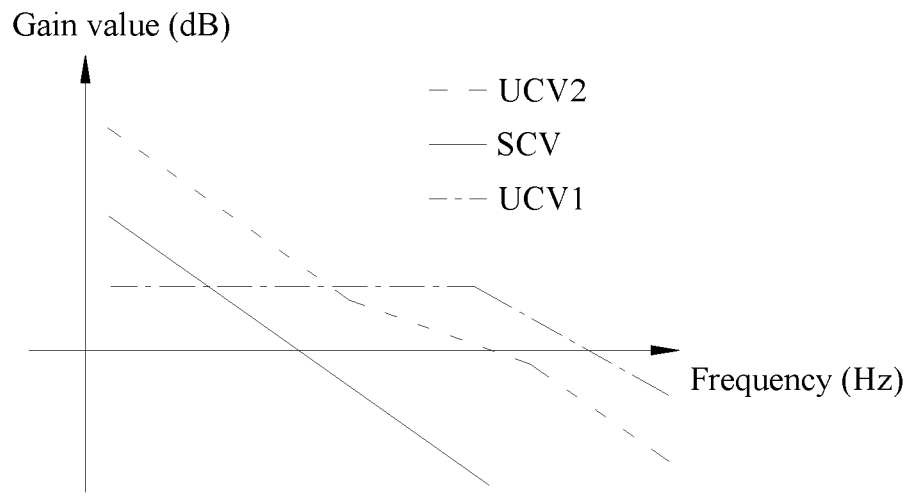

Please refer to FIG. 3, FIG. 4, and FIG. 5, respectively illustrating the block diagram of the control system of a switching voltage regulator according to the second embodiment of the present invention when the error voltage is a stable independent variable, the block diagram of the control system of a switching voltage regulator according to the second embodiment of the present invention when the error voltage is an unstable independent variable, and the frequency response diagram of the control system of a switching voltage regulator according to the second embodiment of the present invention. In the embodiment, the configuration of the elements with the same symbols is similar to that described above, so the similar descriptions are not to be repeated here. Parts of the configuration are similar to those of the previous drawings, and are to be omitted in the drawings in the embodiment.

As shown in FIG. 3 and FIG. 4, the selection unit 41 separates a range of the error voltage $V_{ERR}$ into a plurality of error voltage groups according to the value of the error voltage $V_{ERR}$. The plurality of error voltage groups include a stable error voltage group SEV and a plurality of unstable error voltage groups UEV. The selection unit 42 separates the plurality of control variable sets CS into a plurality of control variable groups according to the plurality of stable error voltage groups SEV. The plurality of control variable groups include a stable control variable group SCV and an unstable control variable group UCV.

The relationship between the plurality of error voltage groups and the plurality of control variable groups are explained with reference to FIG. 3 and FIG. 4. As shown in FIG. 3, when the selection unit 41 determines that the error voltage $V_{ERR}$ falls within the stable error voltage group SEV, the selection unit 41 selects the stable control variable group SCV stored in the storage unit 42. The proportional unit 43, the differential unit 44, and the integral unit 45 perform calculation to obtain the calculation result R according to the stable control variable group SCV. The lookup unit 46 selects the corresponding signal of the conversion rate CR according to the new calculation result R and transmits the signal to the conversion rate control end 13. The conversion rate control end 13 selects the corresponding conversion rate to steadily supply the output voltage $V_{OUT}$ to the load element 20 so that the load element 20 is able to function normally. As shown in FIG. 4, when the selection unit 41 determines that the error voltage $V_{ERR}$ falls in one of the plurality of the unstable error voltage groups UEV, the selection unit 41 selects the unstable control variable group UCV corresponding to the unstable error voltage group UEV. The proportional unit 43, the differential unit 44, and the differential unit 45 perform calculation to obtain the new calculation result R. The lookup unit 46 selects the corresponding signal of the conversion rate CR according to the new calculation R and transmits the signal to the conversion rate control end 13. The conversion rate control end 13 selects the corresponding conversion rate to adjust the output voltage $V_{OUT}$, and the above adjustment operation is repeated until the output voltage $V_{OUT}$ falls within the voltage regulation range.

The following examples illustrate the relationship between a plurality of independent variables IV and a plurality of dependent variables DV. In an example (A), there are two error voltage groups and two control variable groups. In an example (B), there are three error voltage groups and three control variable groups.

Example A

TABLE 1

| Output Voltage $V_{OUT}$ (Volt) | Error Voltage $V_{ERR}$ | Error Voltage $V_{ERR}$ (Binary) | |
|---|---|---|---|
| 0.86 | $-8_{10}$ | $111000_{20}$ | Unstable error |
| 0.84 | $-7_{10}$ | $111001_{20}$ | voltage group |
| 0.82 | $-6_{10}$ | $111010_{20}$ | UEV |

TABLE 1-continued

| Output Voltage $V_{OUT}$ (Volt) | Error Voltage $V_{ERR}$ | Error Voltage $V_{ERR}$ (Binary) | |
|---|---|---|---|
| 0.80 | $-5_{10}$ | $111011_{20}$ | |
| 0.78 | $-4_{10}$ | $111100_{20}$ | |
| 0.76 | $-3_{10}$ | $111101_{20}$ | |
| 0.74 | $-2_{10}$ | $111110_{20}$ | |
| 0.72 | $-1_{10}$ | $111111_{20}$ | Stable error |
| 0.70 | $0_{10}$ | $000000_{20}$ | voltage group |
| 0.68 | $1_{10}$ | $000001_{20}$ | SEV |
| 0.66 | $2_{10}$ | $000010_{20}$ | Unstable error |
| 0.64 | $3_{10}$ | $000011_{20}$ | voltage group |
| 0.62 | $4_{10}$ | $000100_{20}$ | UEV |
| 0.60 | $5_{10}$ | $000101_{20}$ | |
| 0.58 | $6_{10}$ | $000110_{20}$ | |
| 0.56 | $7_{10}$ | $000111_{20}$ | |
| 0.54 | $8_{10}$ | $001000_{20}$ | |

TABLE 2

| | Unstable control variable group UCV | Stable control variable group SCV |
|---|---|---|
| Proportional variable $K_P$ | $01101011_{20}$ | $00000000_{20}$ |
| Integral variable $K_I$ | $010001_{20}$ | $000100_{20}$ |
| Differential variable $K_D$ | $100110010_{20}$ | $000000000_{20}$ |
| Coefficient α | $011011_{20}$ | $000000_{20}$ |

Example B

TABLE 3

| Output voltage $V_{OUT}$ (Volt) | Error Voltage $V_{ERR}$ | Error Voltage $V_{ERR}$ (Binary) | |
|---|---|---|---|
| 1.00 | $-15_{10}$ | $110001_{20}$ | First unstable |
| 0.98 | $-14_{10}$ | $110010_{20}$ | error voltage |
| 0.96 | $-13_{10}$ | $110011_{20}$ | group |
| 0.94 | $-12_{10}$ | $110100_{20}$ | UEV1 |
| 0.92 | $-11_{10}$ | $110101_{20}$ | |
| 0.90 | $-10_{10}$ | $110110_{20}$ | |
| 0.88 | $-9_{10}$ | $110111_{20}$ | |
| 0.86 | $-8_{10}$ | $111000_{20}$ | Second |
| 0.84 | $-7_{10}$ | $111001_{20}$ | unstable error |
| 0.82 | $-6_{10}$ | $111010_{20}$ | voltage group |
| 0.80 | $-5_{10}$ | $111011_{20}$ | UEV2 |
| 0.78 | $-4_{10}$ | $111100_{20}$ | |
| 0.76 | $-3_{10}$ | $111101_{20}$ | |
| 0.74 | $-2_{10}$ | $111110_{20}$ | |
| 0.72 | $-1_{10}$ | $111111_{20}$ | Stable error |
| 0.70 | $0_{10}$ | $000000_{20}$ | voltage group |
| 0.68 | $1_{10}$ | $000001_{20}$ | SEV |
| 0.66 | $2_{10}$ | $000010_{20}$ | Second |
| 0.64 | $3_{10}$ | $000011_{20}$ | unstable error |
| 0.62 | $4_{10}$ | $000100_{20}$ | voltage group |
| 0.60 | $5_{10}$ | $000101_{20}$ | UEV2 |
| 0.58 | $6_{10}$ | $000110_{20}$ | |
| 0.56 | $7_{10}$ | $000111_{20}$ | |
| 0.54 | $8_{10}$ | $001000_{20}$ | |
| 0.53 | $9_{10}$ | $001001_{20}$ | |
| 0.50 | $10_{10}$ | $001010_{20}$ | |
| 0.48 | $11_{10}$ | $001011_{20}$ | First unstable |
| 0.46 | $12_{10}$ | $001100_{20}$ | error voltage |
| 0.44 | $13_{10}$ | $001101_{20}$ | group UEV1 |
| 0.42 | $14_{10}$ | $001110_{20}$ | |
| 0.40 | $15_{10}$ | $001111_{20}$ | |
| 0.38 | $16_{10}$ | $010000_{20}$ | |

TABLE 4

| | Second unstable control variable group UCV2 | Stable control variable group SCV | First Unstable control variable group UCV1 |
|---|---|---|---|
| Proportional variable $K_P$ | $01101011_{20}$ | $00000000_{20}$ | $11111111_{20}$ |
| Integral variable $K_I$ | $010001_{20}$ | $000100_{20}$ | $000000_{20}$ |
| Differential variable $K_D$ | $100110010_{20}$ | $000000000_{20}$ | $011000000_{20}$ |
| Coefficient α | $011011_{20}$ | $000000_{20}$ | $011011_{20}$ |

According to Tables 1 to 4 with reference to FIG. 5, the voltage regulation range is from 0.68 volts to 0.72 volts. The farther the output voltage $V_{OUT}$ is from the voltage regulation range, the greater the adjustment range for the proportional variable $K_P$, integral variable $K_I$, and differential variable $K_D$ is needed, so as to make the output voltage $V_{OUT}$ fall within the range of 0.68 to 0.72 volts and be steadily supplied to the load element 20, thereby preventing the load component 20 from receiving excessive voltage to cause malfunction. In addition, the numbers of the plurality of error voltage groups and the plurality of control variable groups can be appropriately increased in accordance with the range of the output voltage $V_{OUT}$. The present invention is not limited to the range of the two or three error voltage groups and control variable groups in aforementioned embodiment.

Figure 6:
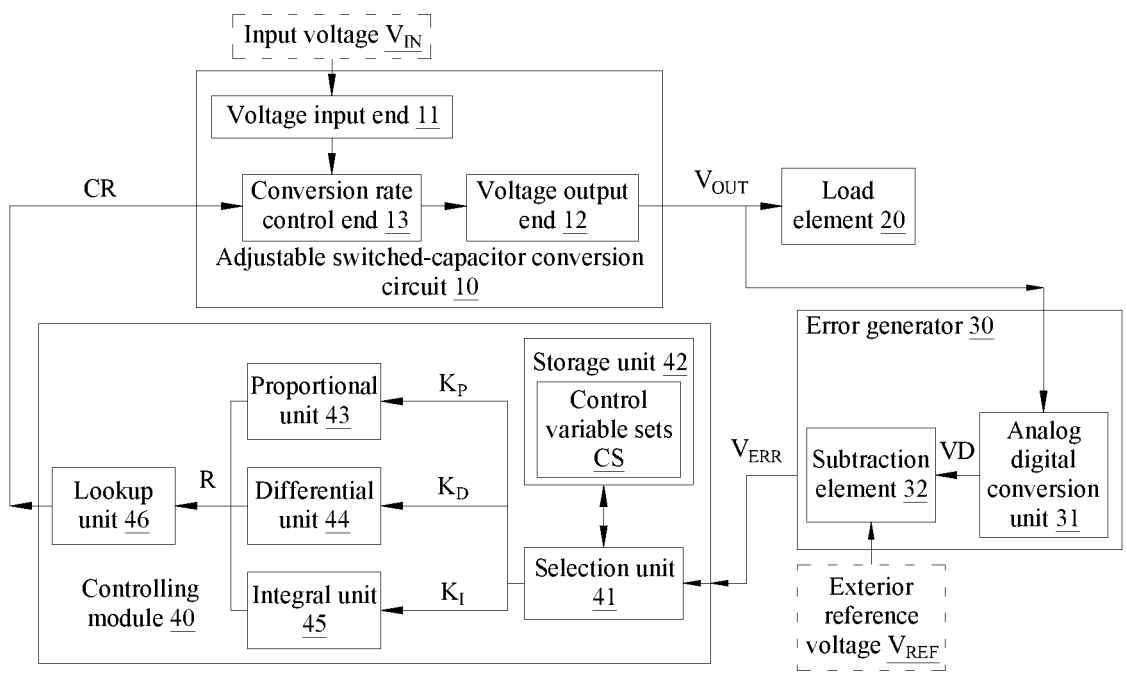
FIG. 6 is a block diagram of the control system of a switching voltage regulator according to the third embodiment of the present invention.
Figure 7:
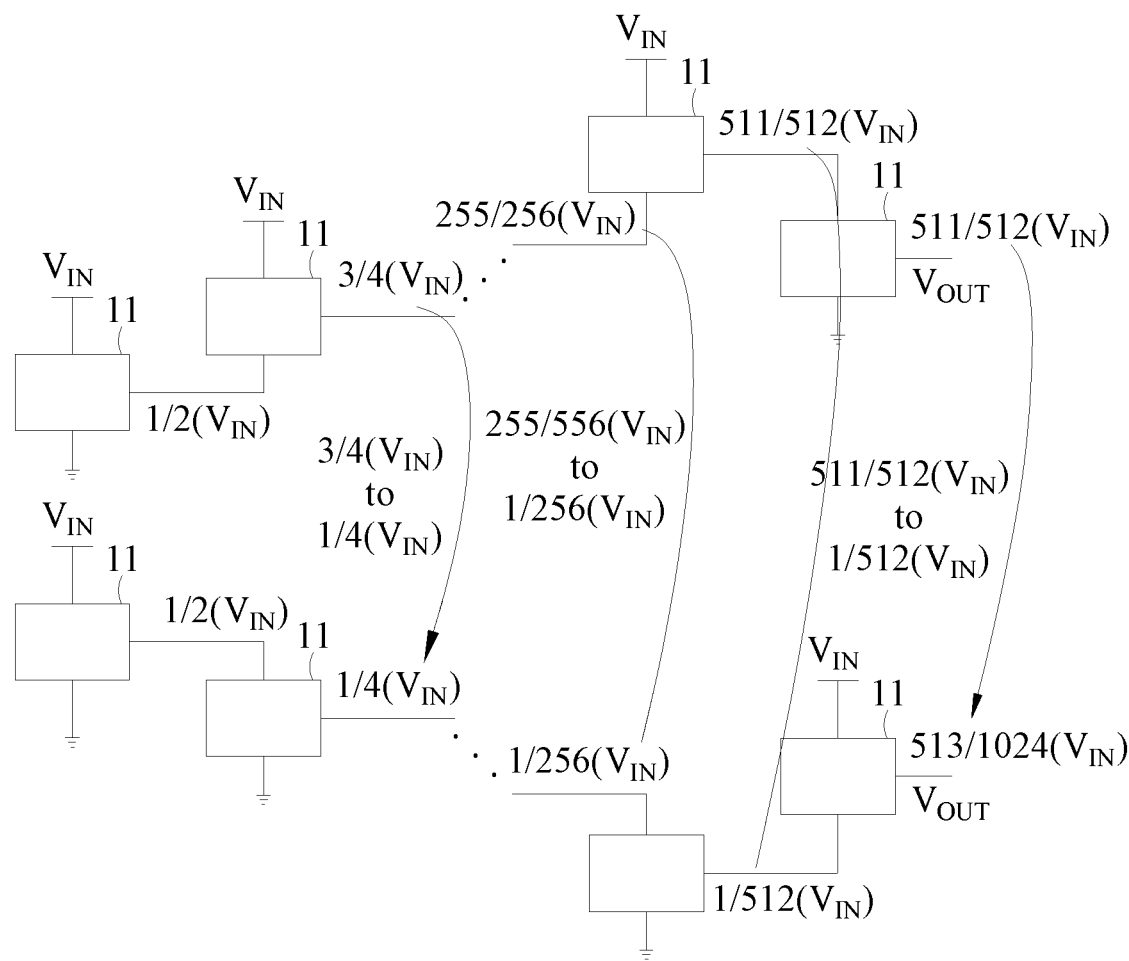
FIG. 7 is a circuit configuration diagram of the control system of a switching voltage regulator according to the third embodiment of the present invention.
Figure 8:
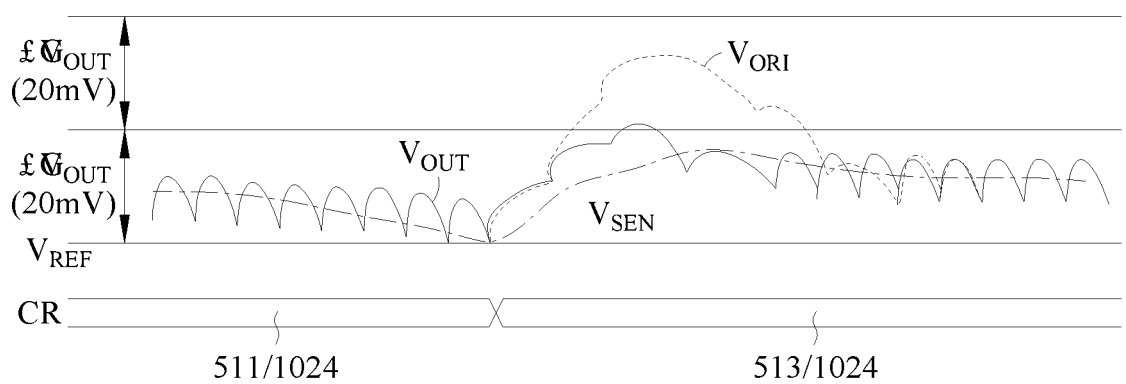
FIG. 8 is a voltage waveform diagram of the control system of a switching voltage regulator according to the third embodiment of the present invention.

Please refer to FIG. 6, FIG. 7, and FIG. 8, respectively illustrating the block diagram of the control system of a switching voltage regulator according to the third embodiment of the present invention, the circuit configuration diagram of the control system of a switching voltage regulator according to the third embodiment of the present invention, and the voltage waveform diagram of the control system of a switching voltage regulator according to the third embodiment of the present invention. In the embodiment, the configuration of the elements with the same symbols is similar to that described above, so the similar descriptions are not to be repeated here. Parts of the configuration are similar to those of the previous drawings, and are to be omitted in the drawings in the embodiment.

It is worth mentioning that the error generator 30 includes an analog digital conversion element 31 and a subtraction element 32. The analog digital conversion element 31 is connected to the voltage output end 12 and converts the output voltage $V_{OUT}$ into a digital output voltage $V_D$. The subtraction element 32 is connected between the analog digital conversion element 31 and the controlling module 40, and subtracts exterior reference voltage $V_{REF}$ from the digital output voltage $V_D$ to obtain the error voltage $V_{ERR}$. The method of comparing the output voltage $V_{OUT}$ with the external reference voltage $V_{REF}$ to obtain the error voltage VERR can vary, which is not limited to the method specified in the present invention.

In addition, the condition of different load element 20 requiring different voltages is described as follows. In a first condition, when the load element 20 needs a first voltage regulation range higher than the voltage regulation range, the error voltage $V_{ERR}$ increases and an operational frequency f of the adjustable switched-capacitor conversion circuit 10 is adjusted to be higher. The selection unit 41 re-selects the corresponding control variable set CS to make the output voltage $V_{OUT}$ fall within the first voltage regulation range, so as to prevent overshooting. In a second condition, when the load element 20 needs a second voltage regulation range lower than the voltage regulation range, the error voltage $V_{ERR}$ decreases and the operational frequency f of the adjustable switched-capacitor conversion circuit 10 is adjusted to be lower. The selection unit 41 re-selects the corresponding control variable sets CS to make the output voltage $V_{OUT}$ fall within the second voltage regulation range, so as to prevent undershooting.

Therefore, the present invention provides the output voltage $V_{OUT}$ to the load element 20 according to different voltage requirements of different load element 20. Regardless of high or low voltages, the present invention can provide corresponding output voltage $V_{OUT}$ so that the load element 20 can function more smoothly. In addition, as shown in FIG. 6, the precision of voltage regulation range can be increased through two groups of the plurality of adjustable switched-capacitor conversion circuits 10. The more the adjustable switching capacitor conversion circuits 10 are, the higher the precision of the output voltage $V_{OUT}$ can be. That is, the output voltage $V_{OUT}$ with different precision can be achieved by controlling the number of the adjustable switched-capacitor conversion circuits 10 to match the output voltage $V_{OUT}$ with different precision of the load element 20.

For example, the control system of the present invention can be applied to an electric device. FIG. 7 shows comparison of the waveform of the output voltage $V_{ORI}$ originally supplied in the electric vehicle with the waveform of the output voltage $V_{OUT}$ supplied by the control system of the present invention. It is obvious that overshooting may occur in the waveform of the output voltage $V_{ORI}$ originally supplied in the electric device when the output voltage $V_{ORI}$ increases, and overshooting does not occur in the waveform of the output voltage $V_{OUT}$ supplied by the control system of the present invention, and the output voltage $V_{OUT}$ can steadily be supplied to the electric device, so as to prevent the electric device from malfunctioning. In addition, when the output voltage $V_{OUT}$ is averaged to obtain an average output voltage $V_{SEN}$, the voltage waveform of the average output voltage $V_{SEN}$ is quite smooth; it indicates that the output voltage $V_{OUT}$ can steadily be increased. Similarly, undershooting does not occur on the output voltage $V_{OUT}$ supplied by the control system of present invention when the output voltage $V_{OUT}$ decreases so that the electric vehicle can function normally. Therefore, the control system of a switching voltage regulator of the present invention is quite suitable for the electric device to supply the output voltage $V_{OUT}$ in a condition that the output voltage $V_{OUT}$ is increased or decreased, so that the electric vehicle can function normally.

To summarize, the control system of a switching voltage regulator of the present invention utilizes the controlling module 40 to cope with different load elements 20 required by different output voltages $V_{OUT}$ so that the load elements 20 can function more smoothly. By controlling the operational frequency f of the adjustable switched-capacitor conversion circuit 10, the output voltage $V_{OUT}$ increases or decreases to meet the voltage requirements of the load element 20, so that the load element 20 can run at any time. The control system of a switching voltage regulator of the present invention has the advantages stated above. Whether a high voltage or a low voltage is required, the present invention is able to supply the voltage to the load element 20 so that the load element 20 can function normally.

The above description is merely illustrative rather than restrictive. Any equivalent modification or alteration without departing from the spirit and scope of the present invention should be included in the appended claims.

What is claimed is:

1. A control system of a switching voltage regulator, comprising:
an adjustable switched-capacitor conversion circuit, having a plurality of discrete conversion rates, and comprising a voltage input end, a voltage output end, and a conversion rate control end, wherein the voltage input end is configured to receive an input voltage, the voltage output end is configured to output an output voltage to a load element, the conversion rate control end is configured to receive a signal of the conversion rate, and the adjustable switched-capacitor conversion circuit utilizes one of the plurality of discrete conversion rates according to the signal of the conversion rate and converts the input voltage into the output voltage according to the used conversion rate, so as to make the output voltage fall within a voltage regulation range;
an error generator, connected to the voltage output end, and comparing the output voltage with an external reference voltage to obtain an error voltage; and
a controlling module, connected between the error generator and the adjustable switched-capacitor conversion circuit, and comprising a storage unit, a selection unit, a proportional unit, a differential unit, and an integral unit, wherein the storage unit is configured to store a plurality of control variable sets, the selection unit is configured to select one of the plurality of control variable sets according to the error voltage, and at least two of the proportional unit, the differential unit, and the integral unit are configured to calculate to obtain a calculation result according to the selected control variable set, and generate and transmit the signal of the conversion rate to the conversion rate control end.

2. The control system according to claim 1, wherein the adjustable switched-capacitor conversion circuit is a fine-resolution switched-capacitor circuit.

3. The control system according to claim 1, wherein the selection unit selects at least one of the plurality of the control variable sets to adjust the output voltage of the adjustable switched-capacitor conversion circuit when the error voltage changes.

4. The control system according to claim 3, wherein the error voltage increases when the load element needs a first voltage regulation range higher than the voltage regulation range, an operational frequency of the adjustable switched-capacitor conversion circuit is adjusted to be higher and the selection unit re-selects the corresponding control variable set to make the output voltage fall within the first voltage regulation range.

5. The control system according to claim 3, wherein the error voltage decreases when the load element needs a second voltage regulation range lower than the voltage regulation range, the operational frequency of the adjustable switched-capacitor conversion circuit is adjusted to be lower and the selection unit re-selects the corresponding control variable set to make the output voltage fall within the second voltage regulation range.

6. The control system according to claim 1, wherein the different error voltage corresponds to the different control variable set.

7. The control system according to claim 1, wherein the controlling module further comprises a lookup unit, and the lookup unit determines the signal of the conversion rate according to the calculation result.

8. The control system according to claim 1, wherein the selection unit separates a range of the error voltage into a plurality of error voltage groups, the plurality of error voltage groups comprise a stable error voltage group and a plurality of unstable error voltage groups, the storage unit separates the plurality of control variable sets into a plurality of control variable groups according to the plurality of error voltage groups, and the plurality of control variable groups comprise a stable control variable group and a plurality of unstable control variable groups.

9. The control system according to claim 8, wherein the selection unit selects the stable control variable group when the selection unit determines that the error voltage falls within the stable error voltage group, and at least two of the proportional unit, the differential unit, and the integral unit calculate to obtain the calculation result according to the selected stable control variable set.

10. The control system according to claim 8, wherein the selection unit selects the unstable control variable group corresponding to the unstable error voltage group when the selection unit determines that the error voltage falls within one of the plurality of unstable error voltage groups, and at least two of the proportional unit, the differential unit, and the integral unit calculate to obtain the calculation result according to the selected unstable control variable set.

11. The control system according to claim 1, wherein the error generator comprises an analog digital conversion element and a subtraction element, the analog digital conversion element is connected to the voltage output end and converts the output voltage into a digital output voltage, and the subtraction element is connected between the analog digital conversion element and the controlling module and subtracts the digital output voltage from the external reference voltage to obtain the error voltage.

* * * * *